US008405859B2

(12) United States Patent
Torii (10) Patent No.: US 8,405,859 B2
(45) Date of Patent: Mar. 26, 2013

(54) OUTPUT INSTRUCTION APPARATUS AND OUTPUT INSTRUCTION PROGRAM

(75) Inventor: Yuko Torii, Atsugi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 386 days.

(21) Appl. No.: 12/754,528

(22) Filed: Apr. 5, 2010

(65) Prior Publication Data

US 2010/0265541 A1      Oct. 21, 2010

(30) Foreign Application Priority Data

Apr. 15, 2009   (JP) ................................ 2009-098862

(51) Int. Cl.
*G06F 15/00*   (2006.01)
*G06F 15/16*   (2006.01)
(52) U.S. Cl. ...................................... 358/1.15; 709/203
(58) Field of Classification Search .................. 358/1.15
See application file for complete search history.

(56) References Cited

U.S. PATENT DOCUMENTS

| 7,047,088 B2 | 5/2006 | Nakamura et al. | |
| 2009/0237724 A1* | 9/2009 | Furuya ........................ | 358/1.15 |

FOREIGN PATENT DOCUMENTS

| JP | 2007-013280 | 1/2007 |
| JP | 2007-036987 | 2/2007 |
| JP | 2008-225551 | 9/2008 |
| WO | WO 01/73558 | 10/2001 |

OTHER PUBLICATIONS

Notice of Reasons for Refusal issued by JPO on Mar. 14, 2011, in connection with Appl. No. 2009-098862, 2 pgs.
Translation of Notice of Reasons for Refusal issued by JPO on Mar. 14, 2011, in connection with Appl. No. 2009-098862, 3 pgs.

* cited by examiner

*Primary Examiner* — Saeid Ebrahimi Dehkordy
(74) *Attorney, Agent, or Firm* — Squire Sanders (US) LLP (57) ABSTRACT

A computer readable recording medium storing an output instruction program for giving output instructions to multiple types of devices, wherein the output instruction program causes a computer to function as a control section which: displays an output setting screen divided into a common setting area for setting a common items common to the multiple types of devices, and an individual setting area for each device type for setting individual items set for each device type, when the output setting screen for setting an output conditions for the multiple types of devices is displayed on the display section; and, generates the output setting information which applies the output conditions set in the common setting area to all the device types, and applies the output conditions set in the individual setting area of each device type to the each device type.

5 Claims, 12 Drawing Sheets

OUTPUT CONTROL SYSTEM

90: DISPLAY TERMINAL REGISTRATION SCREEN

ELECTRONIC PAPER TERMINAL REGISTRATION SCREEN

TERMINAL NAME: KM-SHIRO ELECTRONIC PAPER TERMINAL
TERMINAL INFORMATION
MODEL NAME: KONICA MINOLTA ELECTRONIC PAPER TERMINAL AAA
GRADATION / COLOR: 256-LEVEL GRAY SCALE
RESOLUTION: 1280 X 1024 PIXEL
NUMBER OF SCREENS: ● ONE SCREEN  ○ TWO SCREENS
DISPLAY FILE TYPE: ○ NO CHANGE  ● PDF  ○ TIFF  ○ JPEG
CONNECTION METHOD: ● LAN CONNECTION  ○ THROUGH PC
HOST NAME OR IP ADDRESS: 10.201.214.102
PORT NO.: 56789
USER INFORMATION
USER NAME: KM-SHIRO
MAIL ADDRESS: SHIRO.KM@KONICAMINOLTA.JP

[CANCEL] [OK]

FIG. 4

91: OUTPUT DESTINATION SELECTION SCREEN

OUTPUT DESTINATION PAPER SELECTION:
(TWO OR MORE CAN BE SELECTED)

| KM-TARO ELECTRONIC PAPER |
| KM-JIRO ELECTRONIC PAPER 1 |
| KM-JIRO ELECTRONIC PAPER 2 |
| KM-SABURO ELECTRONIC PAPER |
| KM-SHIRO ELECTRONIC PAPER |
| KM-GORO ELECTRONIC PAPER |

OUTPUT DESTINATION PRINTER SELECTION:
PRINTER 2

[OUTPUT SETTING UPDATE] [CANCEL] [OUTPUT START]

FIG. 5A

92: OUTPUT SETTING SCREEN

SETTING MODE: [SPEED PRIORITY ▽]

COMMON SETTING
- NUMBER OF COPIES: [6▽]
  (OUTPUT OF ELECTRONIC PAPER: ⦿ INCLUDED ○ NOT INCLUDED)
- PAGE DESIGNATION: ⦿ ALL ○ PAGE DESIGNATION [ ]-[ ]       [MOVE TO INDIVIDUAL SETTING]
- ENLARGE / REDUCE: ⦿ NO ○ FIT PAGE
- COLOR: ○ FULL COLOR ⦿ GRAY SCALE                          [MOVE TO INDIVIDUAL SETTING]
- RESOLUTION: ○ HIGHT ○ INTERMEDIATE ⦿ LOW

ELECTRONIC PAPER SETTING
- OUTPUT FAILURE: ○ DO NOTHING ⦿ OUTPUT TO PRINTER ○ NOTIFY BY MAIL
- TERM OF VALIDITY: ⦿ NO TIME LIMIT ○ TIME LIMIT SETTING [2009▽] YEAR [12▽] MONTH [31▽] DAY

PRINTER SETTING
- DUPLEX PRINTING: ○ SIMPLEX ⦿ DUPLEX ○ BOOKLET
- PAGE ASSIGNMENT: ○ NONE ⦿ 2 IN 1 ○ 4 IN 1
- PAPER SIZE: ⦿ NO CHANGE ○ A3 ○ A4 ○ B3 ○ B4
- STAPLE: ⦿ NONE ○ LEFT CORNER ○ RIGHT CORNER ○ TWO POINTS
- PUNCH: ⦿ NONE ○ TWO HOLES

[CANCEL] [OK]

| | SETTING MODE: SPEED PRIORITY ▽ |
|---|---|
| COMMON SETTING | NUMBER OF COPIES: 6▽<br>(OUTPUT OF ELECTRONIC PAPER: ⦿ INCLUDED ○ NOT INCLUDED)<br>PAGE DESIGNATION: ⦿ ALL ○ PAGE DESIGNATION ☐ - ☐  [MOVE TO INDIVIDUAL SETTING]<br>ENLARGE / REDUCE: ⦿ NO ○ FIT PAGE  [MOVE TO INDIVIDUAL SETTING]<br>RESOLUTION: ○ HIGHT ○ INTERMEDIATE ⦿ LOW  [MOVE TO INDIVIDUAL SETTING] |
| ELECTRONIC PAPER SETTING | COLOR: ○ FULL COLOR ⦿ GRAY SCALE  [MOVE TO COMMON SETTING]<br>OUTPUT FAILURE: ○ DO NOTHING ○ OUTPUT TO PRINTER ○ NOTIFY BY MAIL<br>TERM OF VALIDITY: ⦿ NO TIME LIMIT ○ TIME LIMIT SETTING 2009▽ YEAR 12▽ MONTH 31▽ DAY |
| PRINTER SETTING | COLOR: ○ FULL COLOR ⦿ GRAY SCALE  [MOVE TO COMMON SETTING]<br>DUPLEX PRINTING: ○ SIMPLEX ⦿ DUPLEX ○ BOOKLET<br>PAGE ASSIGNMENT: ○ NONE ⦿ 2 IN 1 ○ 4 IN 1<br>PAPER SIZE: ⦿ NO CHANGE ○ A3 ○ A4 ○ B3 ○ B4<br>STAPLE: ⦿ NONE ○ LEFT CORNER ○ RIGHT CORNER ○ TWO POINTS<br>PUNCH: ⦿ NONE ○ TWO HOLES |

[CANCEL]  [OK]

93: OUTPUT SETTING SCREEN

SETTING MODE: ECOLOGY PRIORITY MODE ▽

COMMON SETTING
- NUMBER OF COPIES: 6 ▽
  (OUTPUT OF ELECTRONIC PAPER: ⦿ INCLUDED ○ NOT INCLUDED)
- PAGE DESIGNATION: ⦿ ALL ○ PAGE DESIGNATION ☐ — ☐   [MOVE TO INDIVIDUAL SETTING]
- ENLARGE / REDUCE: ⦿ NO ○ FIT PAGE   [MOVE TO INDIVIDUAL SETTING]
- COLOR: ○ FULL COLOR ⦿ GRAY SCALE   [MOVE TO INDIVIDUAL SETTING]
- RESOLUTION: ○ HIGHT ⦿ INTERMEDIATE ○ LOW   [MOVE TO INDIVIDUAL SETTING]

ELECTRONIC PAPER SETTING
- OUTPUT FAILURE: ○ DO NOTHING ○ OUTPUT TO PRINTER ⦿ NOTIFY BY MAIL
- TERM OF VALIDITY: ⦿ NO TIME LIMIT ○ TIME LIMIT SETTING 2009 ▽ YEAR 12 ▽ MONTH 31 ▽ DAY

PRINTER SETTING
- DUPLEX PRINTING: ○ SIMPLEX ⦿ DUPLEX ○ BOOKLET
- PAGE ASSIGNMENT: ○ NONE ⦿ 2 IN 1 ○ 4 IN 1
- PAPER SIZE: ○ NO CHANGE ○ A3 ⦿ A4 ○ B3 ○ B4
- STAPLE: ⦿ NONE ○ LEFT CORNER ○ RIGHT CORNER ○ TWO POINTS
- PUNCH: ⦿ NONE ○ TWO HOLES

[CANCEL] [OK]

FIG. 7

94: OUTPUT SETTING SCREEN

SETTING MODE: [ FOR CUSTOMER ▽ ]

COMMON SETTING
- NUMBER OF COPIES: [6▽]
  (OUTPUT OF ELECTRONIC PAPER: ⦿ INCLUDED ○ NOT INCLUDED)
- PAGE DESIGNATION: ⦿ ALL ○ PAGE DESIGNATION [ ]—[ ]   [MOVE TO INDIVIDUAL SETTING]
- ENLARGE / REDUCE: ⦿ NO ○ FIT PAGE   [MOVE TO INDIVIDUAL SETTING]
- COLOR: ⦿ FULL COLOR ○ GRAY SCALE   [MOVE TO INDIVIDUAL SETTING]
- RESOLUTION: ⦿ HIGHT ○ INTERMEDIATE ○ LOW   [MOVE TO INDIVIDUAL SETTING]

ELECTRONIC PAPER SETTING
- OUTPUT FAILURE: ○ DO NOTHING ⦿ OUTPUT TO PRINTER ○ NOTIFY BY MAIL
- TERM OF VALIDITY: ⦿ NO TIME LIMIT ○ TIME LIMIT SETTING [2009▽] YEAR [12▽] MONTH [31▽] DAY

PRINTER SETTING
- DUPLEX PRINTING: ○ SIMPLEX ⦿ DUPLEX ○ BOOKLET
- PAGE ASSIGNMENT: ⦿ NONE ○ 2 IN 1 ○ 4 IN 1
- PAPER SIZE: ⦿ NO CHANGE ○ A3 ○ A4 ○ B3 ○ B4
- STAPLE: ○ NONE ○ LEFT CORNER ○ RIGHT CORNER ⦿ TWO POINTS
- PUNCH: ⦿ NONE ○ TWO HOLES

[CANCEL] [OK]

FIG. 8

95: OUTPUT SETTING SCREEN

SETTING MODE: IN-HOUSE CONFERENCE ▽

COMMON SETTING
- NUMBER OF COPIES: 6▽
  (OUTPUT OF ELECTRONIC PAPER: ⦿INCLUDED ○NOT INCLUDED)
- PAGE DESIGNATION: ⦿ALL ○PAGE DESIGNATION □-□   [MOVE TO INDIVIDUAL SETTING]
- ENLARGE / REDUCE: ⦿NO ○FIT PAGE   [MOVE TO INDIVIDUAL SETTING]
- RESOLUTION: ○HIGHT ⦿INTERMEDIATE ○LOW   [MOVE TO INDIVIDUAL SETTING]

ELECTRONIC PAPER SETTING
- COLOR: ⦿FULL COLOR ○GRAY SCALE   [MOVE TO COMMON SETTING]
- OUTPUT FAILURE: ○DO NOTHING ○OUTPUT TO PRINTER ⦿NOTIFY BY MAIL
- TERM OF VALIDITY: ○NO TIME LIMIT ⦿TIME LIMIT SETTING 2009▽YEAR 12▽MONTH 31▽DAY

PRINTER SETTING
- COLOR: ○FULL COLOR ⦿GRAY SCALE   [MOVE TO COMMON SETTING]
- DUPLEX PRINTING: ○SIMPLEX ⦿DUPLEX ○BOOKLET
- PAGE ASSIGNMENT: ○NONE ⦿2 IN 1 ○4 IN 1
- PAPER SIZE: ⦿NO CHANGE ○A3 ○A4 ○B3 ○B4
- STAPLE: ○NONE ○LEFT CORNER ○RIGHT CORNER ⦿TWO POINTS
- PUNCH: ⦿NONE ○TWO HOLES

[CANCEL]  [OK]

FIG. 9

96: OUTPUT SETTING SCREEN

SETTING MODE: CUSTOM SETTING 1 ▽

| COMMON SETTING | NUMBER OF COPIES: 6▽ (OUTPUT OF ELECTRONIC PAPER: ⦿ INCLUDED ○ NOT INCLUDED) |
|---|---|
| ELECTRONIC PAPER SETTING | PAGE DESIGNATION: ⦿ ALL ○ PAGE DESIGNATION ☐–☐ [MOVE TO COMMON SETTING]<br>ENLARGE / REDUCE: ⦿ NO ○ FIT PAGE [MOVE TO COMMON SETTING]<br>COLOR: ⦿ FULL COLOR ○ GRAY SCALE [MOVE TO COMMON SETTING]<br>RESOLUTION: ⦿ HIGHT ○ INTERMEDIATE ○ LOW [MOVE TO COMMON SETTING]<br>OUTPUT FAILURE: ⦿ DO NOTHING ○ OUTPUT TO PRINTER ○ NOTIFY BY MAIL<br>TERM OF VALIDITY: ⦿ NO TIME LIMIT ○ TIME LIMIT SETTING 2009▽ YEAR 12▽ MONTH 31▽ DAY |
| PRINTER SETTING | PAGE DESIGNATION: ⦿ ALL ○ PAGE DESIGNATION ☐–☐ [MOVE TO COMMON SETTING]<br>ENLARGE / REDUCE: ⦿ NO ○ FIT PAGE [MOVE TO COMMON SETTING]<br>COLOR: ⦿ FULL COLOR ○ GRAY SCALE [MOVE TO COMMON SETTING]<br>RESOLUTION: ⦿ HIGHT ○ INTERMEDIATE ○ LOW [MOVE TO COMMON SETTING]<br>DUPLEX PRINTING: ⦿ SIMPLEX ○ DUPLEX ○ BOOKLET<br>PAGE ASSIGNMENT: ⦿ NONE ○ 2 IN 1 ○ 4 IN 1<br>PAPER SIZE: ⦿ NO CHANGE ○ A3 ○ A4 ○ B3 ○ B4<br>STAPLE: ⦿ NONE ○ LEFT CORNER ○ RIGHT CORNER ○ TWO POINTS<br>PUNCH: ⦿ NONE ○ TWO HOLES |

[CANCEL] [OK]

FIG. 10

OUTPUT SETTING XML DATA

```xml
<Settings>
<Current Setting>SPEED PRIORITY</Current Settings>
<Output Setting modename="SPEED PRIORITY">
 <Common Settings>
    <item name="NUMBER OF COPIES">8</item>
    <item name="ELECTRONIC PAPER OUTPUT">INCLUDED</item>
    <item name="PAGE DESIGNATION">ALL</item>
    <item name="ENLARGE/REDUCE">NONE</item>
    <item name="COLOR/GRAY SCALE"></item>
    <item name="RESOLUTION">LOW</item>
 </Common Settings>
 <E paper Settings>
    <item name="OUTPUT FAILURE">OUTPUT TO PRINTER</item>
    <item name="TERM OF VALIDITY">NO TIME LIMIT</item>
 </E paper Settings>
 <Printer Settings>
    <item name="DUPLEX PRINTING">DUPLEX</item>
    <item name="PAGE ASSIGNMENT">2 in 1</item>
    <item name="PAPER SIZE">NO CHANGE</item>
    <item name="STAPLE">NONE</item>
    <item name="PUNCH">NONE</item>
 </Printer Settings>
</Output Settings>
         ⋮
<Output Settings modename="CUSTOM SETTING 1">
 <Common Settings>
    <item name="NUMBER OF COPIES">8</item>
    <item name="ELECTRONIC PAPER OUTPUT">INCLUDED</item>
 </Common Settings>
 <E paper Settings>
    <item name="PAGE DESIGNATION">ALL</item>
    <item name="ENLARGED/REDUCTION">NONE</item>
    <item name="COLOR">FULL COLOR</item>
    <item name="RESOLUTION">HIGHT</item>
    <item name="OUTPUT FAILURE">OUTPUT TO PRINTER</item>
    <item name="TERM OF VALIDITY">NO TIME LIMIT</item>
 </ Epaper Settings>
 <Printer Settings>
    <item name="PAGE DESIGNATION">ALL</item>
    <item name="ENLARGED/REDUCTIO">NONE</item>
    <item name="COLOR">FULL COLOR</item>
    <item name="RESOLUTION">HIGHT</item>
    <item name="DUPLEX PRINTING">DUPLEX</item>
    <item name="PAGE ASSIGNMENT">2 in 1</item>
    <item name="PAPER SIZE">NO CHANGE</item>
    <item name="STAPLE">NONE</item>
    <item name="PUNCH">NONE</item>
 </Printer Settings>
</Output Settings>
</Settings>
```

FIG. 11

OUTPUT INSTRUCTION APPARATUS AND OUTPUT INSTRUCTION PROGRAM

RELATED APPLICATION

The present application is based on Patent Application No. 2009-098862 filed at the Japan Patent Office on Apr. 15, 2009 and which is hereby incorporated herein in its entirety.

TECHNICAL FIELD

The present invention relates to an output instruction apparatus and output instruction program, particularly to an output instruction apparatus for instructing output to multiple types of devices including an image forming apparatus, and a printer driver operated by this output instruction apparatus.

BACKGROUND

A display terminal of a slim configuration such as an electronic paper and electronic book has been developed in recent years, and there has been an increase in the number of users browsing such contents as materials and documents. This type of display terminal (hereinafter referred to as "content display terminal") is connected to the network by wired means or wireless means to get content data from a computer apparatus and others. Accordingly, applications to various forms of use have been proposed.

In one of the embodiments, the computer apparatus of a client, a printing apparatus such as a printer and digital multi-functional peripheral (hereinafter referred to as "image forming apparatus") and a content display terminal are connected to the network in a company and other bodies, and the conference material is outputted from the image forming apparatus or is displayed on the content display terminal.

If a user as a member of a conference has no content display terminal with him, materials must be printed out by the image forming apparatus. Further, even when the user has a content display terminal at hand, the materials may not be displayed because the terminal is not connected with the network, for example; in this case, the materials must be printed out by the image forming apparatus as well. Thus, in the output instruction apparatus for instructing output to these apparatuses, two types of settings are performed—setting for allowing the image forming apparatus to print out materials, and setting for allowing the content display terminal to display data.

A technique related to the control of such multiple types of devices, for example, is disclosed in the Japanese Patent Application Publication No. 2008-225551. Disclosed in this Patent Publication is a data processing system capable of outputting data from the printer driver to the paper like display apparatus and/or to the printing apparatus. Further, the Japanese Patent Application Publication No. 2007-36987 discloses a printing system for dynamic generation of the print setting screen in conformity to the device.

However, when output conditions are to be set on the multiple types of devices such as an image forming apparatus and content display terminal, a setting must be made for each device type even if setting items are common to multiple types of devices in the conventional technique. This requires complicated and time consuming setting operations. Further, setting errors may occur.

In view of the aforementioned background, it is an object of the present invention to provide an output instruction apparatus and output instruction program that allow easy and reliable setting of the output conditions on multiple types of devices.

SUMMARY (1) To achieve at least one of the abovementioned objects, a computer readable recording medium storing an output instruction program for giving output instructions to multiple types of devices, reflecting one aspect of the present invention; wherein the output instruction program causes a computer to function as a control section which: displays an output setting screen divided into a common setting area for setting a common items common to the multiple types of devices, and an individual setting area for each device type for setting individual items set for each device type, when the output setting screen for setting an output conditions for the multiple types of devices is displayed on the display section; and, generates the output setting information which applies the output conditions set in the common setting area to all the device types, and applies the output conditions set in the individual setting area of each device type to the each device type.

(2) The above mentioned storage medium (1), it is desirable that the output instruction program causes a computer to function as a control section which: corresponds a first instruction button to each common item of the common setting area and displays; deletes a common item corresponding to the first instruction button from the common setting area when detect an operation of the first instructions button; displays the common item as an individual item in the individual setting area of each device type.

(3) The above mentioned storage medium (2), it is desirable that the output instruction program causes a computer to function as a control section which; corresponds a second instruction button to an individual items which is displayed at an individual setting area for each device type and displays; deletes the individual item corresponding to the second instruction button from the individual setting area of all the device types when detect an operation of the second instructions button; and displays the individual items as a common items in the common setting area.

(4). The above mentioned storage medium (1), it is desirable that the multiple types of devices includes: an image forming apparatus providing a printing function; and a display terminal provided with a displaying function.

(5) The above mentioned storage medium (4), it is desirable that the output instruction program is a printer driver which sends printing job described in a Page Description Language to the image forming apparatus.

BRIEF DESCRIPTION OF THE DRAWINGS

FIG. 10 is a diagram showing an example of the output setting XML data created by the client as an embodiment of the present invention.

DESCRIPTION OF THE PREFERRED EMBODIMENT

As described in the background of the invention, in a company, for example, an output instruction apparatus, image forming apparatus and content display terminal are connected to the network, and the conference and other materials is displayed on the content display terminal, or is printed on an image forming apparatus. When used in this manner, set the output condition separately to the image forming apparatus and content display terminal in the output instruction apparatus, according to the conventional method. This arrangement involves complicated setting operations, much time for setting, and possible setting errors.

In the first embodiment of the present invention, when the output setting screen for setting the output conditions to multiple types of devices is displayed on the display section, the control section (output instruction program) of the output instruction apparatus ensures that the output setting screen is displayed after being divided into the common setting area (e.g., common setting column) for setting the common items common to multiple types of devices, and the individual setting area (e.g., display terminal setting column and printing apparatus setting column) for each device type for setting the individual item that can be set for each device type.

When the common item is moved between the common setting area and individual setting area and an instruction of movement to the individual setting area has been given to a predetermined common item of the common setting area, the display of this common item in the common setting area is deleted, and at the same time, this common item is displayed in the individual setting area of each device type as an individual item.

Further, when an instruction of movement to the common setting area has been given to a predetermined individual item in the individual setting area of one device type, the display of the individual item in the individual setting area of all device types is deleted, and at the same time, this individual item is displayed in the common setting area as a common item.

When setting is to be made on the multiple types of devices such as a content display terminal and image forming apparatus, especially when there are many items to be set, the aforementioned arrangement ensures easy and reliable setting of the items common to the multiple types of devices, as well as easy and reliable setting of the output conditions suitable for each device type.

Figure 1:
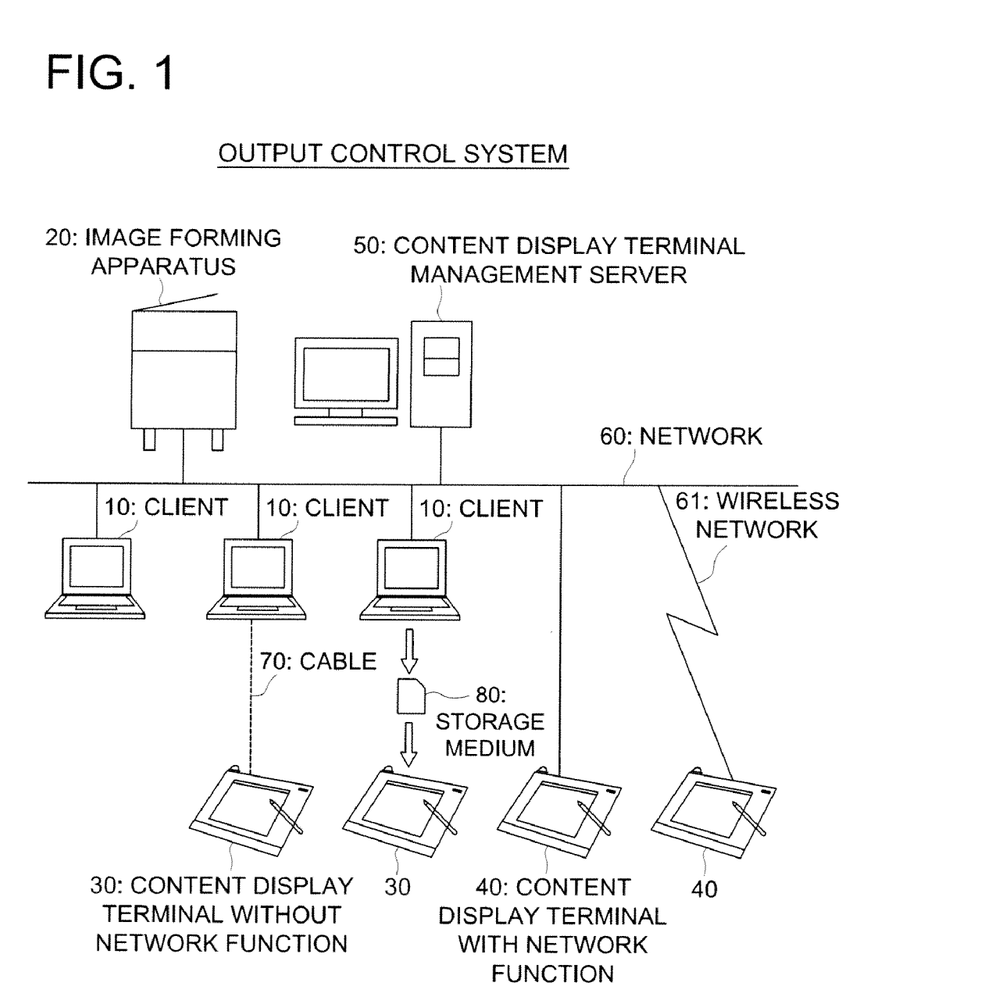
FIG. 1 is a diagram schematically showing the structure of the output control system as an embodiment of the present invention.
Figure 11:
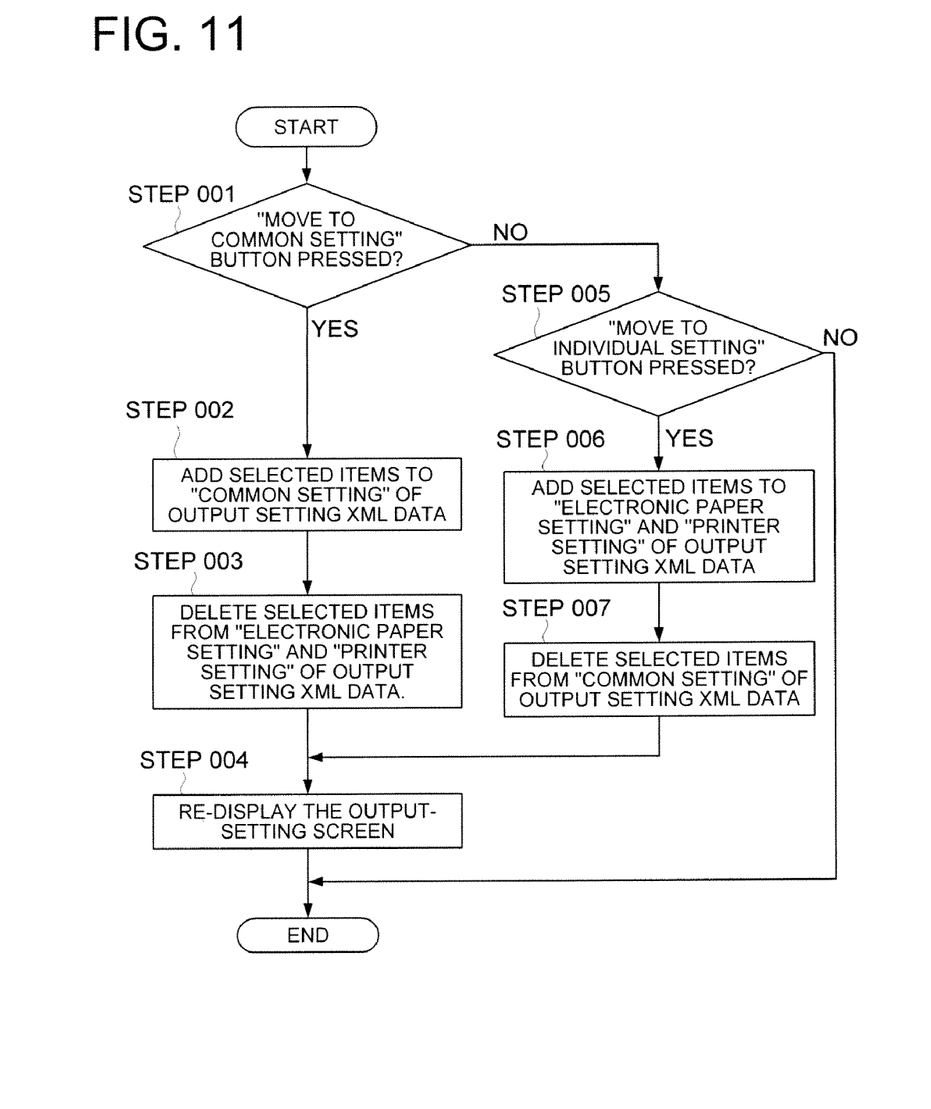
FIG. 11 is a flow chart showing the operation of switching the common setting/individual setting modes of a client as an embodiment of the present invention.

The following further describes the details of one embodiment of the present invention shown above. The output instruction apparatus and output instruction program as an embodiment of the present invention will be described with reference to FIGS. 1 through 11. FIG. 1 is a diagram schematically showing the structure of the output control system in the present embodiment. FIG. 2A is a block diagram showing the function of each apparatus. FIG. 2B is a block diagram showing the function of content display terminal without of the output control system. FIGS. 3 through 9 show an example of the structure of the screen to be displayed on the client's display section. FIG. 10 is a diagram showing an example of the output setting XML data. FIG. 11 is a flow chart showing the operation of switching the common setting/individual setting modes of a client in this embodiment.

As shown in FIG. 1, the output control system of the present embodiment includes an image forming apparatus 20 such as a printer and digital multi-functional peripheral, content display terminals 30 and 40 of an electronic paper and electronic book, a content display terminal management server 50 for controlling the content display terminals 30 and 40, and a client 10 as an apparatus for giving output instructions to these apparatuses. The client 10, image forming apparatus 20, and content display terminal management server 50 are connected through the network 60 using LAN (Local Area Network) and WAN (Wide Area Network). Further, the content display terminal 30 with network function is connected to the network 60 via the wireless LAN 61 and others. Further, the content display terminal 40 without network function can receive the display data such as document information from the client 10 compatible to the standards such as USB (Universal Serial Bus) and IEEE1394, using the storage medium 80 such as the data cable 70 for transferring data and memory card. Referring to FIG. 2A and FIG. 2B, the following describes the specific configuration of each apparatus.

[Client]

The client 10 includes a control section 11, storage section 12, communication section 13, display section 14, and operation section 15; and if required, a cable interface section 16 and medium interface section 17 and others.

The control section 11 is made of a CPU (Central Processing Unit) and others. The storage section 12 is formed of such a memory as ROM (Read Only Memory) and RAM (Random Access Memory), and HDD (Hard Disk Drive). The storage section 12 is also provided with data storage section 12a and program storage section 12b. The data storage section 12a is equipped with the output setting storage section to store the output setting for the content display terminals 30 and 40 and the image forming apparatus 20, and a printing job storage section for storing printing job and others. The program storage section 12b is provided on the non-volatile storage section such as ROM and HDD, and stores the program to implement various functions. Such various functions include the output setting function for displaying the output setting screen (to be described later) on the display section 14, and for setting the output conditions for the content display terminals 30 and 40 and image forming apparatus 20 in conformity to the settings on the screen, a document file transmission function for transmitting the document file to the content display terminal management server 50, a printing job creation function for creating the printing job that gives printing instructions to the image forming apparatus 20, a terminal registration function for registering the information of the content display terminals 30 and 40 in the content display terminal management server 50, and output condition display function. The program stored in the ROM and HDD is expanded on the RAM and is run by the CPU.

The aforementioned output setting function and printing job creation function are part of the printer driver functions. When printing instruction is given to the image forming apparatus 20, the printer driver converts the document file created by the document creation application, to the data described in the Page Description Language (PDL), the PDF (Portable Document Format) data, and so on, whereby a printing job is created.

The communication section 13 is formed of the NIC (Network Interface Card) and modem to enable communication with the image forming apparatus 20, content display terminal management server 50, and other client 10.

The display section 14 is made of an LCD (Liquid Crystal Display), and displays a display terminal registration screen (to be described later), output destination selection screen, and output-setting screen. The operation section 15 is comprised of a keyboard and mouse, and permits operations of selecting the output destination, setting or moving the items on the output setting screen, and switching the screen.

The cable interface section 16 includes a connector provided with various types of cables 70. The medium interface section 17 is made of the slots for mounting various types of storage media 80 and provides document image data to the content display terminal without network function 40.

[Image Forming Apparatus]

The image forming apparatus 20 includes a control section 21, storage section 22, communication section 23, display section 24, operation section 25, exposure processing section 26, and printing section 27.

The control section 21 includes a CPU. The storage section 22 is composed of memory such as a ROM and RAM, and HDD, and is provided with a data storage section 22a and program storage section 22b. The data storage section 22a is equipped with a printing data storage section for storing the printing data created in conformity to the printing job sent from the client 10. The program storage section 22b is mounted on the non-volatile storage section of the ROM and HDD, and stores the program of the printing function to allow the printing section 27 to perform printing operations. The program stored in the ROM and HDD is expanded on the RAM, and is run by the CPU.

The communication section 23 includes an NIC and modem, and enables communication with the client 10 and others. The display section 24 includes an LCD, and displays the operation screen. The operation section 25 is composed of a touch panel and enables various operations of the image forming apparatus 20.

The exposure processing section 26 analyzes the printing job received from the client 10, and rasterizes the data of each page, whereby printing data is created.

The printing section 27 includes the elements required for image formation using the image forming process, as exemplified by electrophotographic process and electrostatic recording method. To be more specific, the printing section 27 includes a charging apparatus, photoreceptor drum, exposure apparatus, transfer roller, transfer belt, and fixing apparatus. To put it more specifically, the photoreceptor drum charged by the charging apparatus is irradiated with the light in conformity to the printing data from the exposure apparatus and an electrostatic latent image is formed. The toner charged by the development apparatus is attached to the latent image and thereby development is performed. Then the toner image is transferred to the paper medium through the primary transfer roller and secondary transfer belt, and is fixed by a fixing apparatus.

[Content Display Terminal 30]

The content display terminal 30 provided with the network function includes a control section 31, storage section 32, communication section 33, display section 34, and operation section 35.

The control section 31 is formed of a CPU and others. The storage section 32 includes a memory such as a ROM and RAM, and HDD, and is provided with a data storage section 32a and program storage section 32b. The data storage section 32a has a document image data storage section for storing the document image data sent from the content display terminal management server 50. The program storage section 32b is a non-volatile storage section of the ROM and HDD, and stores the document image data receiving function for receiving document image data from the content display terminal management server 50, and the document image display function for displaying the document image data on the display section 34. The program stored in the ROM and HDD is expanded on the RAM and is run by the CPU.

The communication section 33 is comprised of the NIC provided with wireless LAN function, and modem, and enables communication with the content display terminal management server 50. The display section 34 includes an LCD and displays document image data and others. The operation section 35 includes a touch panel and enables the operations to be performed on the content display terminal 30.

[Content Display Terminal 40]

The content display terminal 40 without network function includes a control section 41, storage section 42, display section 43, operation section 44, cable interface section 45, and medium interface section 46.

The control section 41 is formed of a CPU. The storage section 42 includes a memory such as ROM and RAM, and HDD, and is provided with a data storage section 42a and program storage section 42b. The data storage section 42a has a document image data storage section for storing the document image data received from the client 10 through the cable 70 or read out of the storage medium 80. The program storage section 42b is provided on the non-volatile storage section of the ROM and HDD, and stores the programs for the document image data acquisition function for acquiring document image data from the client 10 or storage medium 80, and the document image display function for displaying an image of document image data on the display section 43. The program stored in the ROM and HDD is expanded on the RAM and is run by the CPU.

The display section 43 includes an LCD, and displays document image data and others. The operation section 44 is made of a touch panel, and enables various operations of the content display terminal 40.

The cable interface section 45 includes a connector for mounting various types of cables 70, and the medium interface section 46 is made of the slots for mounting various types of storage media 80. It enables acquisition of document image data from the client 10.

The content display terminals 30 and 40 in the present embodiment can be an apparatus for displaying the content page (e.g., electronic paper, electronic book, and electronic personal organizer), or another apparatus having other functions (e.g., cellular mobile telephone, PDA (Personal Digital Assistants), and computer terminal). This apparatus can be provided with the same functions.

[Content Display Terminal Management Server 50]

The content display terminal management server 50 includes a control section 51, storage section 52, and communication section 53. If required, a display section 54 and operation section 55 can be included in the content display terminal management server 50.

The control section 51 is made of a CPU. The storage section 52 includes a memory such as a ROM and RAM, and is also provided with a data storage section 52*a* and program storage section 52*b*. The data storage section 52*a* has a terminal management data storage section for storing the information of the content display terminal, information transmitted from the client 10, and a document image data storage section for storing the document image data formed by conversion of the document file into an image. The program storage section 52*b* is mounted on the non-volatile storage section of the ROM and HDD, and stores the program for implementing various functions. Such various functions include the terminal management function for managing the information of the content display terminal transmitted from the client 10, document file receiving function for receiving a document file from the client 10, document image conversion function for converting the document file into the format suitable for display on the content display terminal, output condition management function for managing the status of output to the content display terminals 30 and 40, and a Web server function wherein the client 10 is provided with the Web service by the terminal management function and document file receiving function. The program stored in the ROM and HDD is expanded on the RAM and is run by the CPU.

The communication section 53 is formed of the NIC and modem to enable communication with the client 10 and content display terminal 30 provided with network function. The display section 54 includes an LCD, and displays various forms of screen. Including a keyboard and mouse, the operation section 55 enables various operations to be performed.

Figure 2:
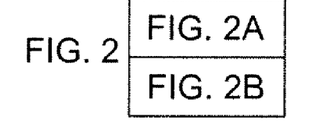
FIG. 2A is a block diagram showing the function of each apparatus of the output control system as an embodiment of the present invention.
FIG. 2B is a block diagram showing the function of content display terminal without of the output control system as an embodiment of the present invention.
Figure 2A:
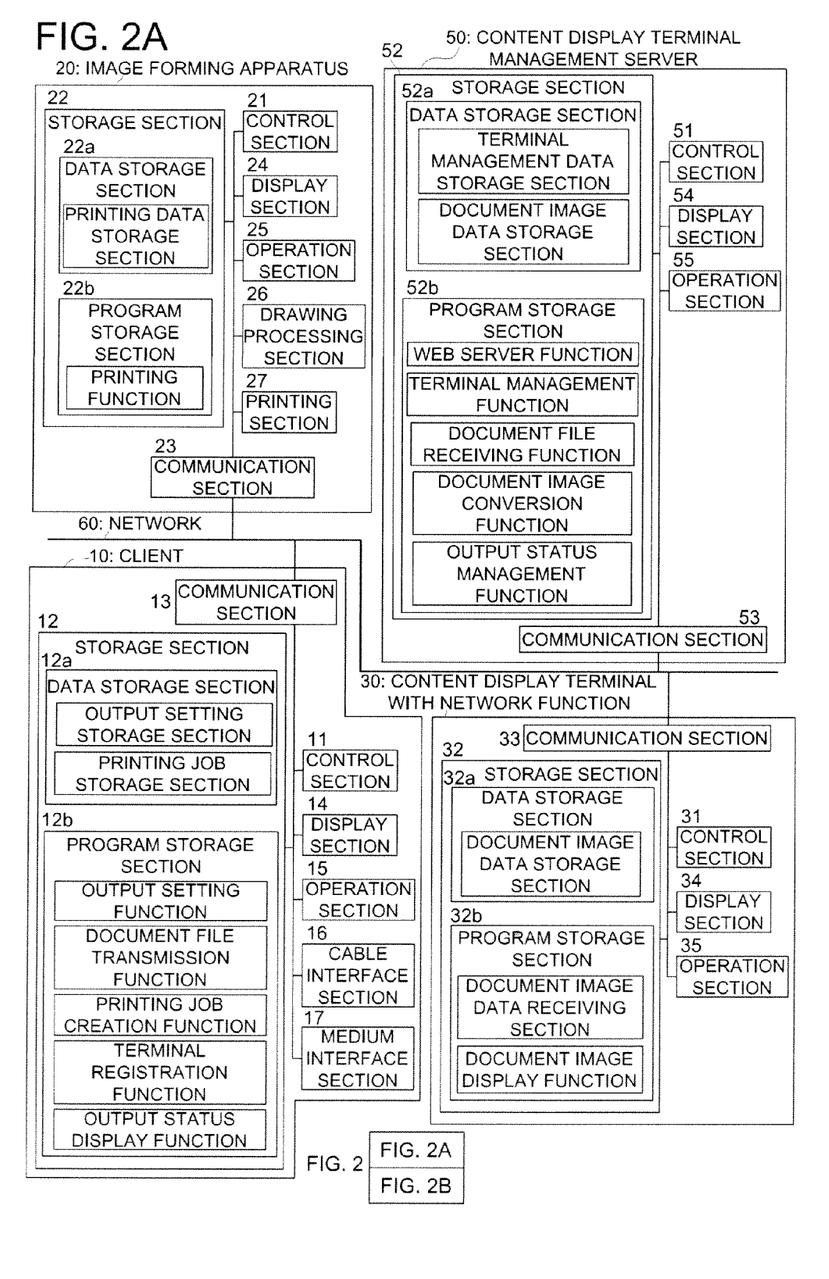
Figure 2B:
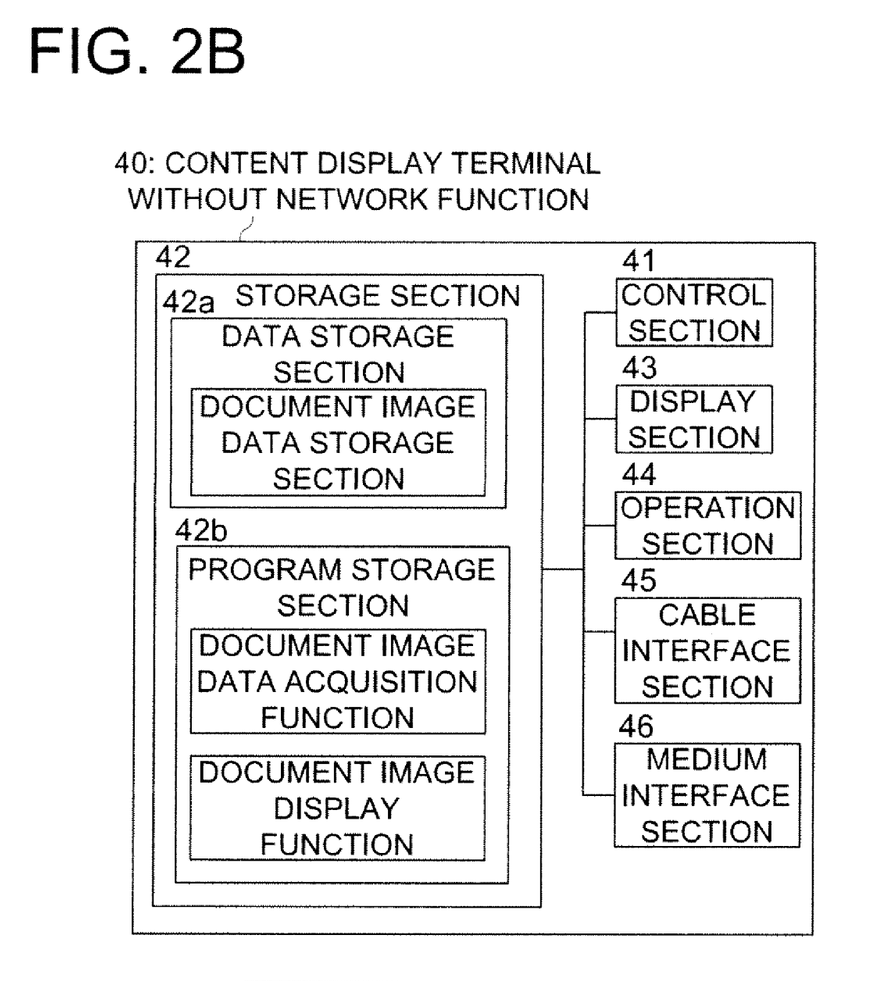

FIGS. 1 and 2 show examples of the present embodiment and can be modified as appropriate. For example, the content display terminal management server 50 can be incorporated in the client 10 or image forming apparatus 20. Further, the document file is sent after having been converted into document image data in this case. For the function for displaying the document file on the content display terminals 30 and 40, however, the file need not be converted into document image data. Further, other means can be used for the Web server function if only the communication between the content display terminal management server 50 and client 10 can be implemented. Further, the printing job creation function can be present on the content display terminal management server 50, and the document image conversion function can be present on the client 10.

The following describes the screen displayed on the display section 14 of the client 10.

Figure 3:
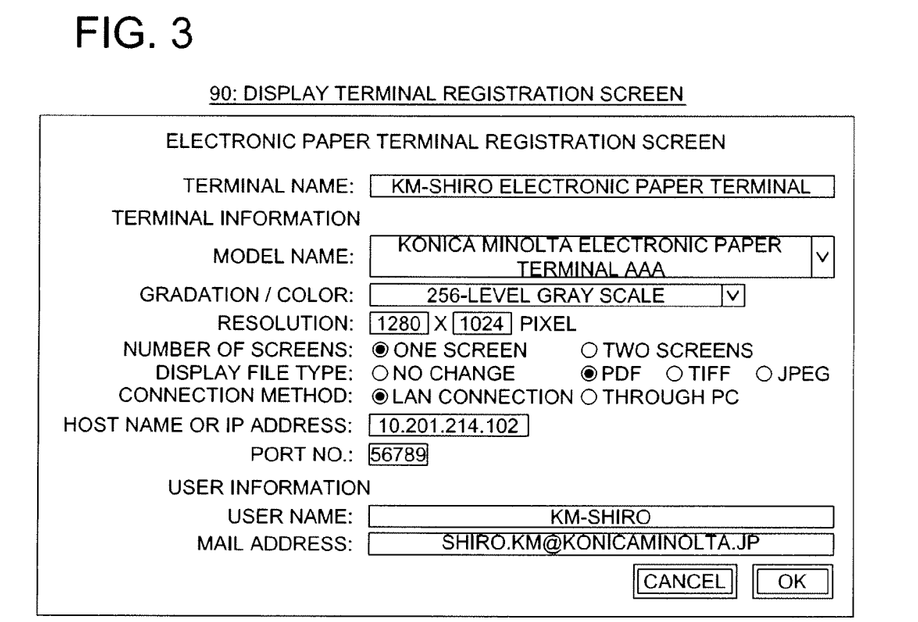
FIG. 3 is a diagram showing an example of the screen (display terminal registration screen) to be displayed on the client's display section as an embodiment of the present invention.

FIG. 3 shows an example of the display terminal registration screen 90 used by the user or administrator to register the content display terminal. The terminal name, model name, user name, and the performances (or capabilities) and connection method of the terminal can be set on this display terminal registration screen 90. If the "OK" button is pressed after setting, the content display terminal is registered by the control section 11 (terminal registration function), and is displayed on the content display terminal list of the output destination selection screen in FIG. 4 (to be described later). The registered content is sent to the content display terminal management server 50, and the content display terminal is registered by the terminal management function of the server.

Figure 4:
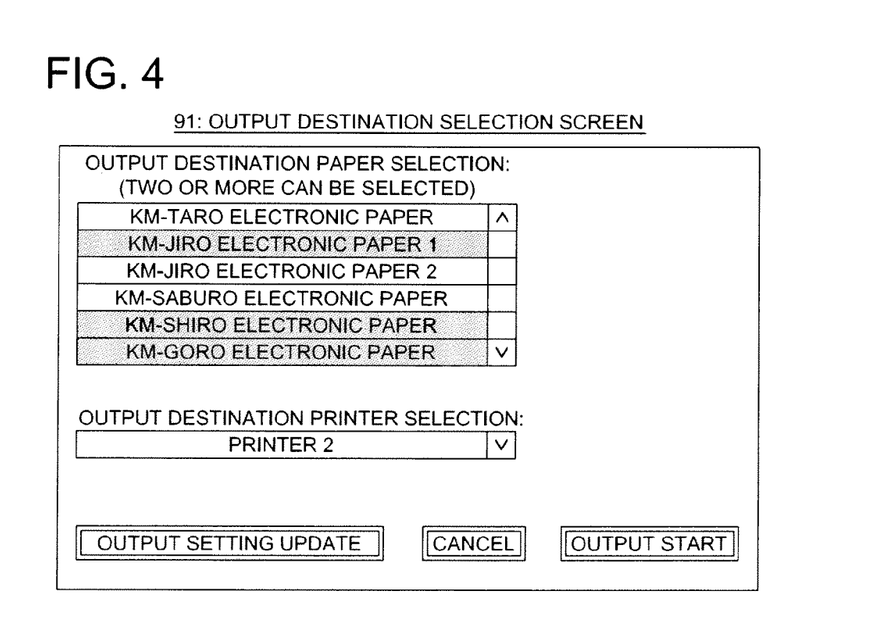
FIG. 4 is a diagram showing an example of the screen (output destination selection screen) displayed on the client's display section as an embodiment of the present invention.

FIG. 4 is an example of the output selection screen 91. When this system is selected as an output destination printer from the printing screen of the document creation application on the client, this output selection screen 91 is displayed by the control section (printer driver). This screen gives a tabulated list display of the content display terminals and image forming apparatuses registered on the output control system (or registered terminals currently available by connection with the network, etc.). Of these terminals, the content display terminal and/or image forming apparatus that can be an output destination is selected. When the output start button is pressed, a step is taken to output to the selected content display terminal and/or image forming apparatus. If the output setting change button is pressed, the operation proceeds to the output setting screen characterizing the present embodiment.

FIG. 5 through FIG. 9 are examples of the output setting screens. These screens are displayed by the control section (printer driver). They permit selection of the setting mode such as Speed Priority and Ecology Priority modes, and display setting and change of the common items for the content display terminal and image forming apparatus, individual items for the content display terminal, and individual items for the image forming apparatus.

Figures 5, 5A:
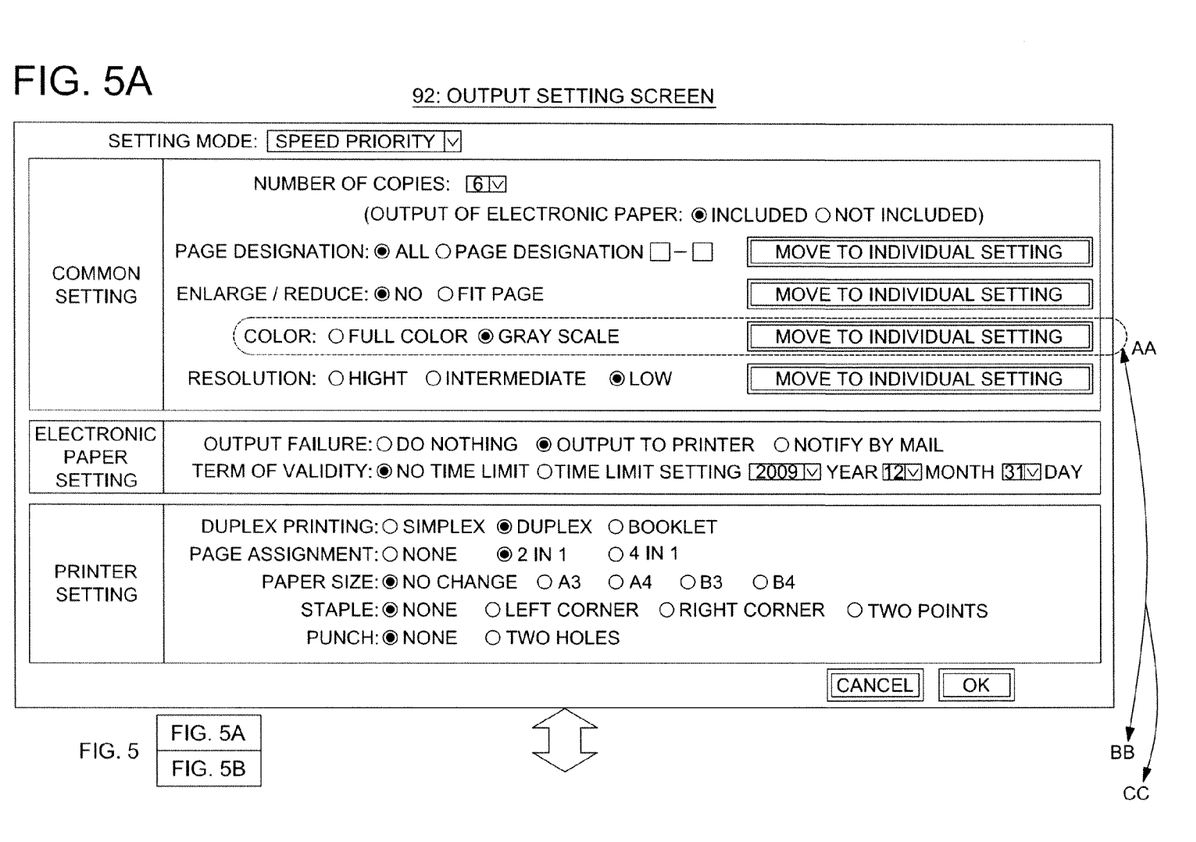
FIG. 5A is a diagram showing an example of the screen (output setting screen (Speed Priority mode)) displayed on the client's display section as an embodiment of the present invention.
Figure 5:
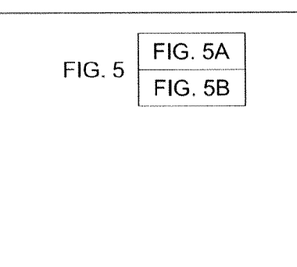
FIG. 5B is a diagram showing an example of the screen (output setting screen (Speed Priority mode)) displayed on the client's display section as an embodiment of the present invention.

FIG. 5A shows an example of the output setting screen 92 displayed when the "Speed Priority" mode has been selected as a setting mode. This output setting screen 92 displays two columns—a common setting column for displaying only the items that can be commonly set for the multiple types of devices selected on the aforementioned output selection screen 91 (referred to as "common item"), and an individual setting column (which consists of an electronic paper setting column and printer setting column in this case) for displaying the items that can be set for individual device types (referred to as "individual item"). The control section 11 (printer driver) applies to all device types wherein the setting content of each common item of the common setting column has been selected. The setting content of each individual item of the individual setting column is applied only to the device type corresponding to the column, whereby the output is controlled.

As described above, the items that can be set commonly for multiple types of devices are collectively displayed in the common setting column. This arrangement eliminates the need of overlapping the setting of the same items for multiple types of devices. This ensures easy and quick operations and eliminates the possibility of setting errors wherein different conditions are inadvertently set, instead of the same conditions being set for multiple types of devices.

Figure 5B:
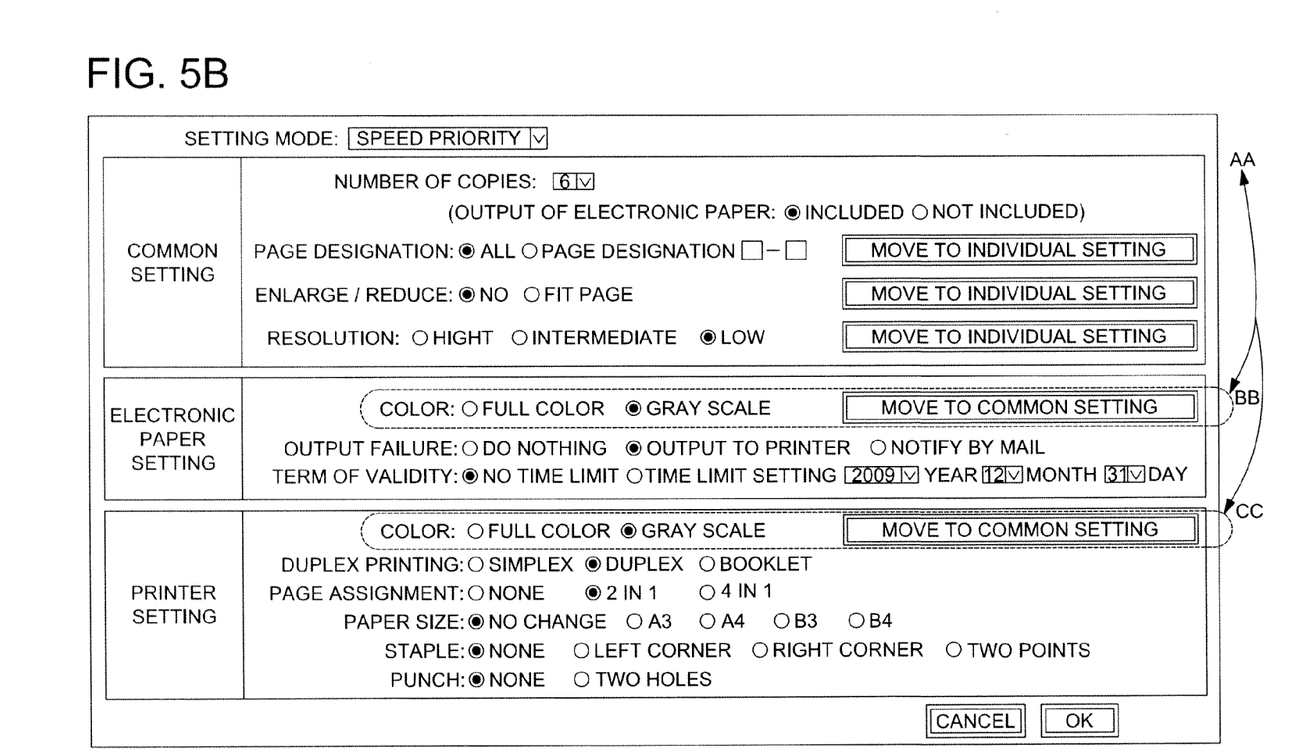

The instruction button ("Move to individual setting" button) for moving each common item to the individual setting column is displayed in each common item of the common setting column. For example, by pressing the instruction button corresponding to the "Color" item in the common setting column on the screen of FIG. 5A, the control section 11 (printer driver), the "Color" item is deleted from the common setting column as shown in FIG. 5B and the "Color" item is displayed in the individual setting column of each device type.

As described above, by pressing the instruction button corresponding to each common item, the common item can be set separately in the individual setting column. This arrangement ensures an easy change of the output condition for each device type.

Further, the instruction button ("Move to common setting" button) for returning the common item to the common setting column is displayed on each common item having been moved to the individual setting column. By pressing the instruction button corresponding to the "Color" item in one of the individual setting columns, for example, on the screen of FIG. 5B, the control section 11 (printer driver) deletes "Color" items from all the individual setting columns, as shown in FIG. 5A. Then the "Color" item is displayed on the common setting column.

As described above, by pressing the instruction button corresponding to each common item having been moved to the individual setting column, the common item can be returned to the common setting column, whereby the user convenience is improved. Further, if of the individual setting columns of the multiple types of devices, the instruction button of the individual setting column of only one device type is pressed, the related common items of individual setting columns of other device types are deleted. This ensures easy operation.

Figure 6:
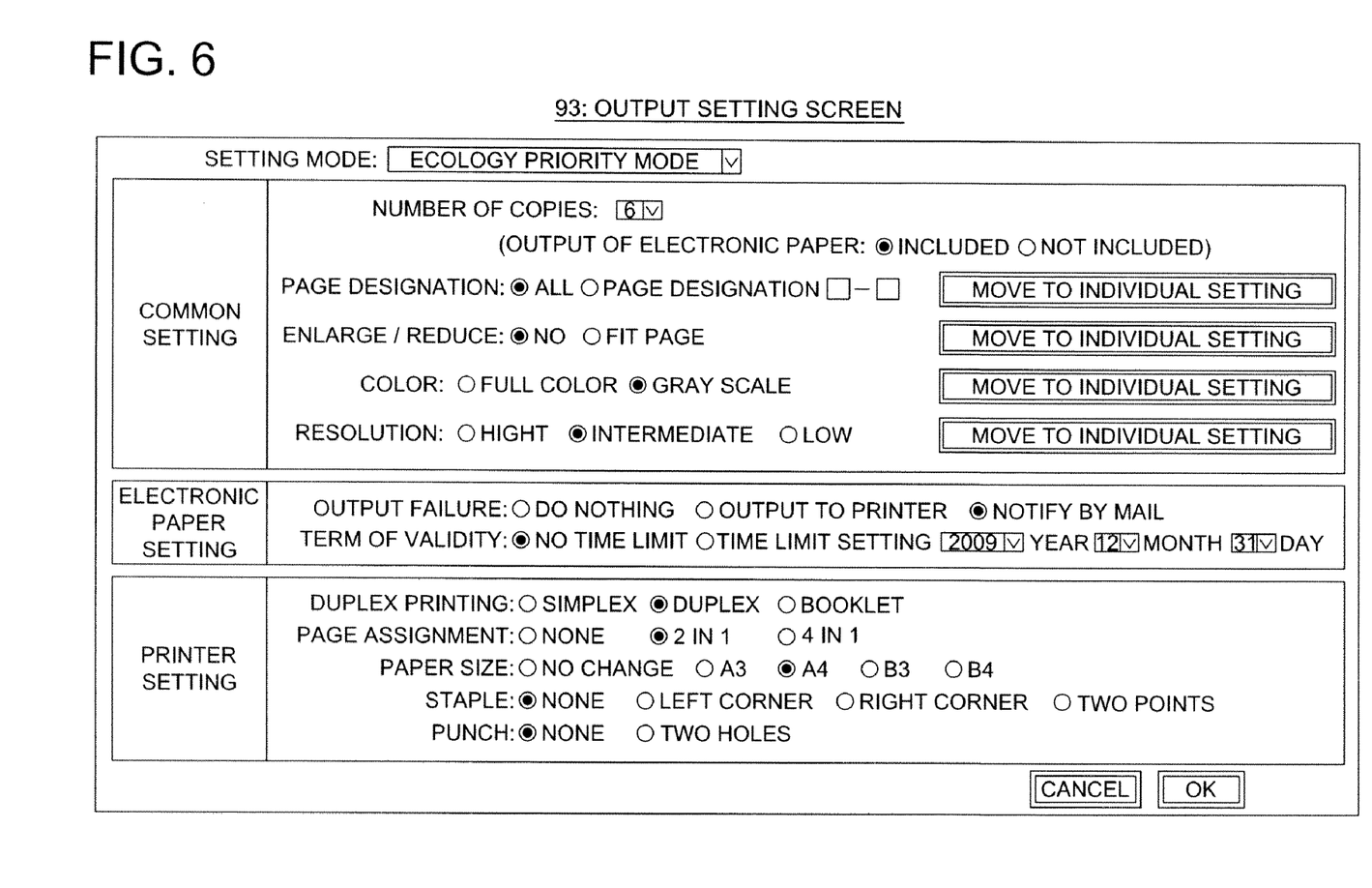
FIG. 6 is a diagram showing an example of the screen (output setting screen (Ecology Priority mode)) displayed on the client's display section as an embodiment of the present invention.
Figure 7:
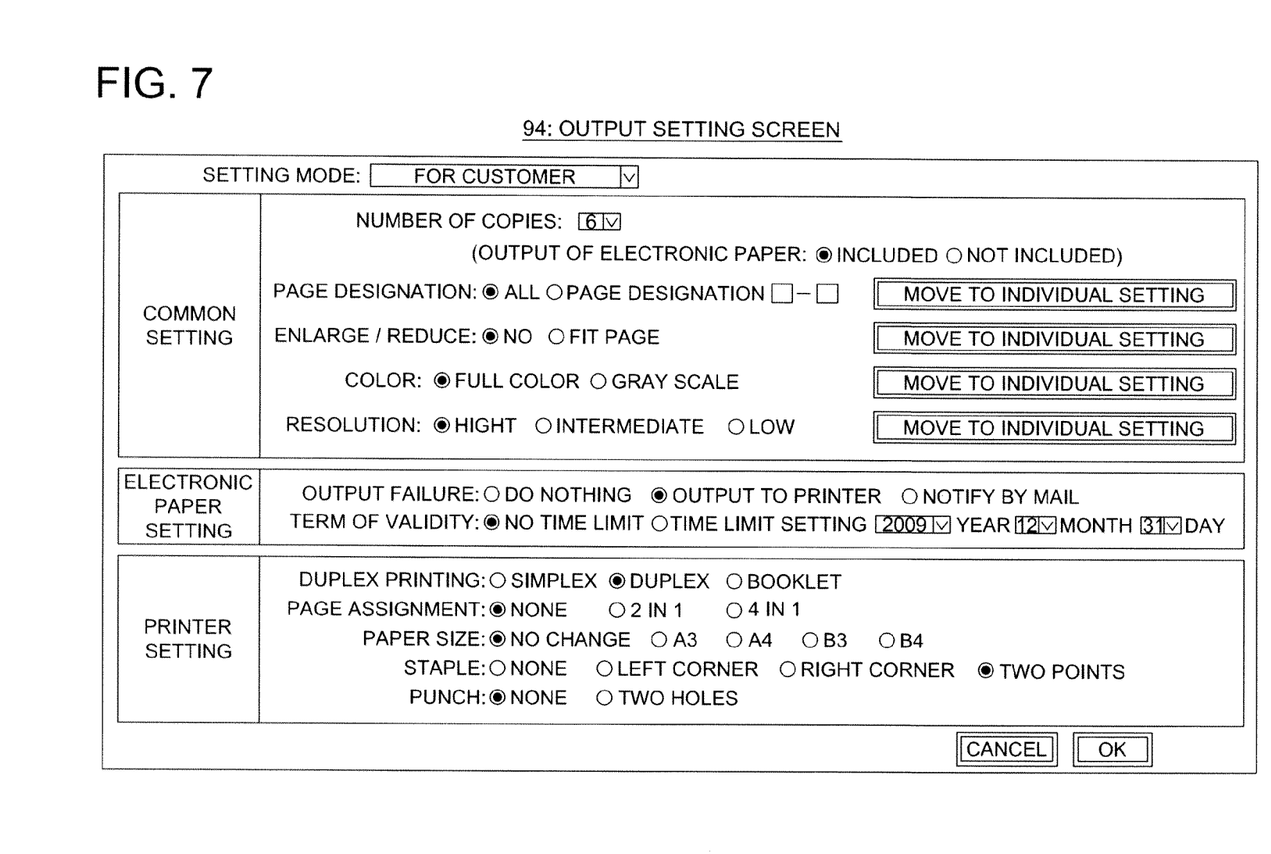
FIG. 7 is a diagram showing an example of the screen (output setting screen (Customer Oriented mode)) displayed on the client's display section as an embodiment of the present invention.

FIG. 6 shows an example of the output setting screen 93 when the setting mode is set to "Ecology Priority". FIG. 7 shows an example of the output-setting screen 94 when the setting mode is set to "For Customer". When comparison is made among FIGS. 5 through 7, the structure of the items in the common setting column and individual setting column is the same. The difference is that the default setting content of each item can be updated to conform to the application requirements (e.g., the highest-speed outputting in the "Speed Priority" and the highest-quality outputting in the "Customer Oriented mode").

Figure 8:
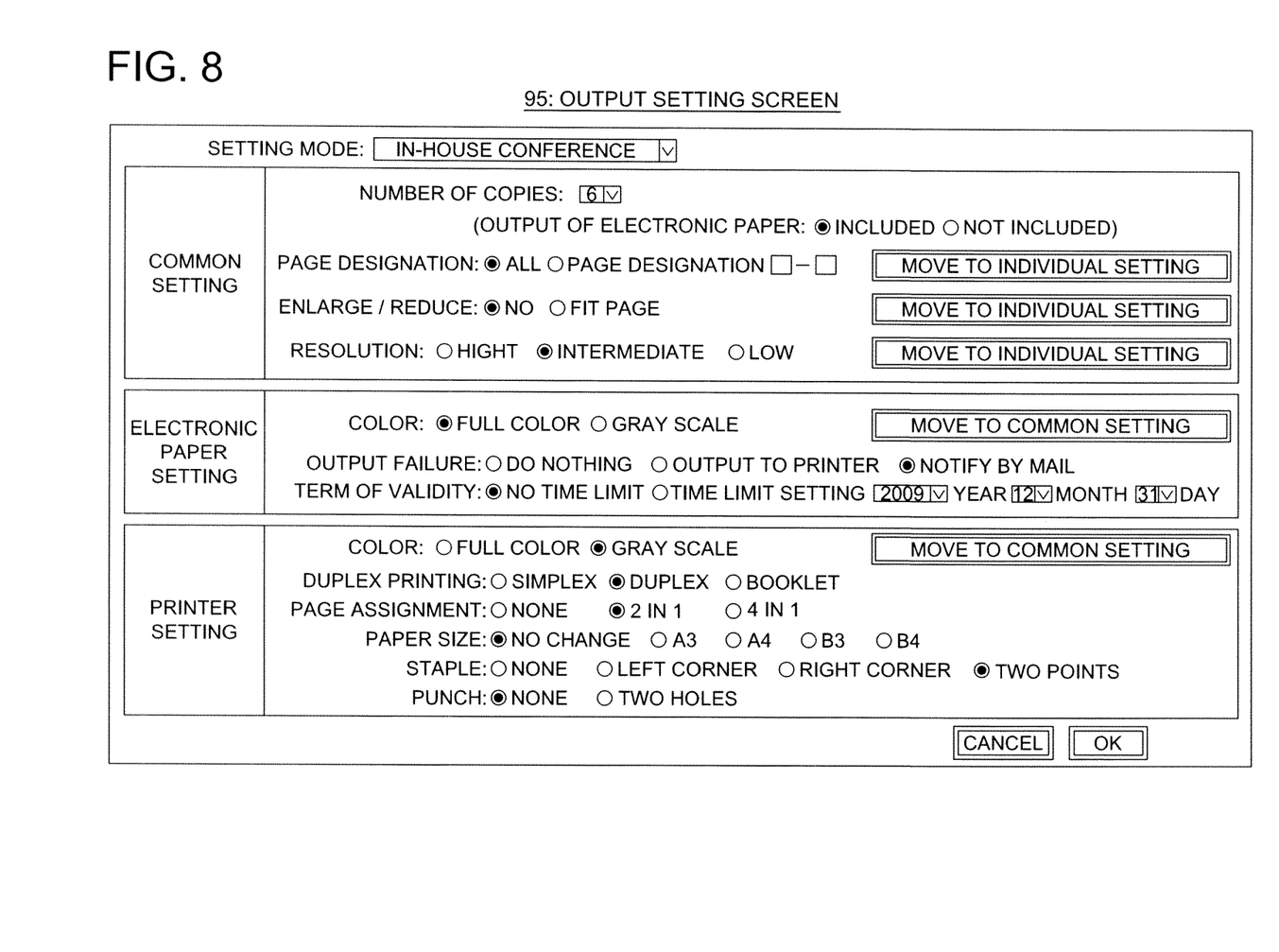
FIG. 8 is a diagram showing an example of the screen (output setting screen (In-house Conference mode)) displayed on the client's display section as an embodiment of the present invention.
Figure 9:
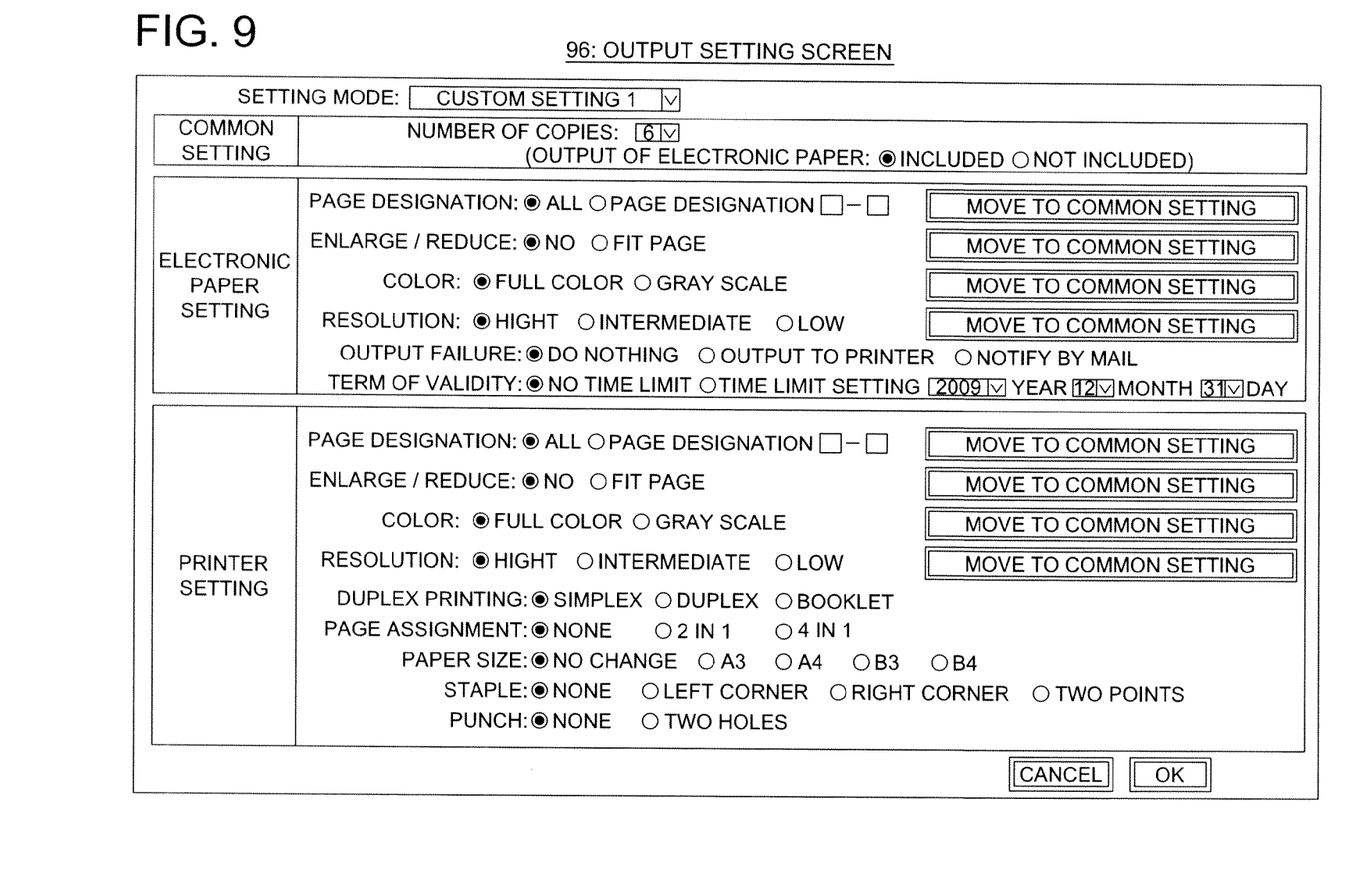
FIG. 9 is a diagram showing an example of the screen (output setting screen (Custom Setting mode)) displayed on the client's display section as an embodiment of the present invention.

FIG. 8 shows an example of the output setting screen 95 wherein the "In-house Conference" is the setting mode. FIG. 9 shows an example of the output setting screen 96 wherein the "Custom Setting" is the setting mode. When comparison is made among FIGS. 5, 8, and 9, the common item displayed on the common setting column by default is updated.

As described above, the setting can be easily changed to meet the particular requirements by modifying the structure of the items arranged in the common setting column and individual setting column by default, and the setting content thereof in conformity to the setting mode. This ensures the user convenience to be improved.

Thus, the user selects the setting mode to be used, changes the displayed setting in conformity to the requirements, and presses the OK button. Then the output setting is changed.

FIG. 10 shows an example of the output setting data stored in the output setting storage section of the client 10. This data includes the current setting mode, the common setting and individual setting items for each setting mode unit, and the settings thereof. Making reference to this data the control section 11 (printer driver) displays the output setting screens 92 through 96 of FIG. 5 through FIG. 9. The data is updated when the OK button, "Move to common setting" button or "Move to individual setting" button has been pressed on the output setting screens 92 through 96. In this case, the output setting data is represented in XML (Extendable Markup Language) format, but can also be expressed by the related database or sequential file.

In the output setting screens 92 through 96 of FIG. 5 through FIG. 9, the operation of the control section 11 (printer driver) in switching between the common setting and individual setting modes will be described with reference to the flow chart of FIG. 11.

In the first place, a step is taken on the output setting screen to determine whether or not the "Move to common setting" button has been pressed (Step 001). If it has been pressed, the information (item name and setting content of that item) of the selection item corresponding to the "Move to common setting" button is added to the common setting of the output setting XML data in FIG. 10 (Step 002), whereby the information of the selection item is deleted from the individual setting (electronic paper setting and printer setting) (Step 003). The output-setting screen is re-displayed based on the updated output setting XML data (Step 004).

If the "Move to common setting" button is not pressed in Step 001, a step is taken to determine whether or not the "Move to individual setting" button has been pressed (Step 005). If it has been pressed, the information (item name and setting content of that item) of the selection item corresponding to the "Move to common setting" button is added to the individual setting (electronic paper setting and printer setting) of the output setting XML data (Step 006). After selection item information has been deleted from the common setting (Step 007), the output-setting screen is re-displayed (Step 004) according to the updated output setting XML data.

If neither the "Move to common setting" button nor "Move to individual setting" button have been pressed (No in Step 001 and No in Step 005), processing terminates without any operation being performed.

As described above, in the present embodiment, when displaying the output setting screen on the display section 14, the control section 11 (printer driver) displays the output setting screen by dividing into two columns—a common setting column for setting the common item common to all device types, and an individual setting column for each device type for setting the individual items that can be set for each device type. This method ensures easy and quick setting of the setting operations, and prevents setting errors from occurring. Further, user convenience is improved by installing the instruction button for moving each common item of the common setting column to the individual setting column, and the instruction button for returning to the common setting column each common item having been moved to the individual setting column.

In the aforementioned embodiment, the output-setting screen is divided into the common setting column and individual setting column for two types of devices (content display terminal and image forming apparatus). An individual setting column for two devices of the same type (content display terminal 1 and content display terminal 2) can be provided, instead of two device types. Alternatively, a combination thereof is also acceptable. Further, a combination of three or more types of devices (e.g. content display terminal, image forming apparatus and Smartphone) is also acceptable.

The output instruction apparatus and output instruction program of the above embodiment ensures easy and reliable setting of the output conditions on multiple types of devices such as an image forming apparatus and content display terminal.

This is because, when displaying the output setting screen, the output instruction apparatus (output instruction program) provides control in such a way that this output setting screen is displayed after being divided into a common setting area for setting common items common to the multiple types of devices, and an individual setting area for each device type for setting the individual item that can be set for each device type. When the common item has been set on the common setting area, the setting content of that item is applied to all device types. This control procedure simplifies the setting operation.

Further, the common item can move between the common setting area and individual setting area. Control is provided in such a way that, when the common item of the common setting area is moved to the individual setting, this common item is displayed as an individual item in the individual setting area of each device type. When the individual item in the individual setting area one device type is moved to the common setting area, this individual item is displayed as a common item in the common setting area, and at the same time, the display of the individual item in the individual setting area of other devices is deleted. This arrangement prevents a common item setting error from occurring and provides settings suited to each device.

What is claimed is:

1. A non-transitory computer-readable-recording-medium storing an output instruction program for giving output instructions to multiple types of devices,
   wherein the output instruction program causes a computer to function as a control section which:
   displays an output setting screen divided into a common setting area for setting a common items common to the multiple types of devices, and an individual setting area for each device type for setting individual items set for each device type, when the output setting screen for setting an output conditions for the multiple types of devices is displayed on the display section;
   generates the output setting information which applies the output conditions set in the common setting area to all the device types, and applies the output conditions set in the individual setting area of each device type to the each device type;
   corresponds a first instruction button to each common item of the common setting area and displays;
   deletes a common item corresponding to the first instruction button from the common setting area when detecting an operation of the first instructions button;
   displays the common item as an individual item in the individual setting area of each device type;
   corresponds a second instruction button to an individual items which is displayed at an individual setting area for each device type and displays;
   deletes the individual item corresponding to the second instruction button from the individual setting area of all the device types when detecting an operation of the second instructions button; and
   displays the individual items as a common items in the common setting area.

2. The non-transitory computer-readable-recording-medium storing the output instruction program of claim 1,
   wherein the multiple types of devices comprises:
   an image forming apparatus providing a printing function; and
   a display terminal provided with a displaying function.

3. The non-transitory computer-readable-recording-medium storing the output instruction program of claim 2,
   wherein the output instruction program is a printer driver which sends printing job described in a Page Description Language to the image forming apparatus.

4. An output instruction apparatus for giving output instructions to multiple types of devices comprising a control section executing a method comprising:
   displaying the output setting screen divided into a common setting area for setting the common items common to the multiple types of devices, and an individual setting area for each divide type for setting individual items set for each device type, when the output setting screen for setting the output conditions for the multiple types of devices is displayed on the display section;
   generating the output setting information which applies the output conditions set in the common setting area to all the device types, and applies the output conditions set in the individual setting area of each device type to the each device type;
   corresponding a first instruction button to each common item of the common setting area and displaying;
   deleting the common item corresponding to the first instruction button from the common setting area when an operation of the first instructions button is detected;
   displaying the common items as an individual item in the individual setting area of each device type;
   corresponding a second instruction button to individual items of an individual setting area and displaying;
   deleting the individual item corresponding to the second instruction button from the individual setting area of all the device types when detecting an operation of the second instructions button; and,
   displaying the individual items as a common items in the common setting area of each device type.

5. The output instruction apparatus of claim 4,
   wherein the multiple types of devices comprises:
   an image forming apparatus provided with a printing function; and
   a display terminal provided with a displaying function.

* * * * *